United States Patent
Smith et al.

(10) Patent No.: US 7,281,126 B2
(45) Date of Patent: Oct. 9, 2007

(54) METHOD OF INSTALLING AN IMAGE ON A CLIENT OVER A NETWORK SECURELY USING A WANBOOT BINARY AND A KERNEL TO INSTALL THE IMAGE

(75) Inventors: Carl F. Smith, Santa Clara, CA (US); Michael W. Carney, Santa Clara, CA (US); Paul Sangster, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 518 days.

(21) Appl. No.: 10/857,344

(22) Filed: May 28, 2004

(65) Prior Publication Data

US 2005/0028154 A1 Feb. 3, 2005

Related U.S. Application Data

(60) Provisional application No. 60/475,025, filed on May 30, 2003.

(51) Int. Cl.
*G06F 9/00* (2006.01)
(52) U.S. Cl. ........................................................ 713/2
(58) Field of Classification Search .................. 713/2; 709/220, 222
See application file for complete search history.

(56) References Cited

U.S. PATENT DOCUMENTS 5,974,547 A * 10/1999 Klimenko ....................... 713/2
7,139,816 B2 * 11/2006 Anand et al. ................ 709/220
2002/0078188 A1 * 6/2002 Anand et al. ................ 709/222

FOREIGN PATENT DOCUMENTS

EP 1 283 464 A1 2/2003

OTHER PUBLICATIONS

Sun Microsystems: "Overview of SSL" (3 Pages) pp. 10-12 Published: Jan. 6, 2002.*
Sun Microsystems; "Provisioning and Change Management Tools"; (23 pages).
Sun Microsystems; "Overview of SSL"; (3 pages).
Sun Microsystems; "Digital Cash"; (15 pages).
Sun Microsystems; "Example Implementations"; (4 pages).
Sun Microsystems; "Secure WAN Boot—Toward a Lights-Out Environment"; (14 pages).
European Search Report dated Sep. 9, 2004 (4 pages).

* cited by examiner

*Primary Examiner*—Thomas Lee
*Assistant Examiner*—Sean Weinman
(74) *Attorney, Agent, or Firm*—Osha Liang, LLP

(57) ABSTRACT

A method for installing an image on a client including obtaining a wanboot binary from the boot server, determining whether the wanboot binary is valid, obtaining a security payload from the boot server using the wanboot binary if the wanboot binary is valid, establishing a first secure connection between the client and boot server, obtaining a boot file system from the boot server using the first secure connection, installing the boot file system on the client to obtain a kernel, establishing a second secure connection between the client and an installation server using the security payload and the kernel, obtaining an installation image from the installation server using the kernel and the second secure connection, and installing the installation image on the client.

53 Claims, 3 Drawing Sheets

METHOD OF INSTALLING AN IMAGE ON A CLIENT OVER A NETWORK SECURELY USING A WANBOOT BINARY AND A KERNEL TO INSTALL THE IMAGE

CROSS-REFERENCE TO RELATED APPLICATIONS

This application claims benefit of U.S. Provisional Application No. 60/475,025, entitled "Methods and Systems for Securely Installing Software via a Network," filed May 30, 2003 under 35 USC § 119(e), the contents of which is incorporated by reference.

BACKGROUND

Typically, when a server is received by an administrator of a network or data center, the server arrives packaged in a box. The administrator subsequently unpacks the server, powers up the server, determines the hardware data corresponding to the server, determines the configuration parameters for the server, and configures another server to perform the installation for the new server.

The aforementioned tasks required by the administrator may further include obtaining the ownership information for the new server, determining what software to install on the server and what additional parameters need to be configured on the server, (e.g., network configuration, etc.), determining the security parameters associated with a secure installation of the new server, etc. The security parameters are important in order for other components (i.e., clients, servers, etc.) to be able to securely identify the new server once the server is part of the network.

Upon completion of the set-up of the server, the server may be installed with the required software so that the server may assume an assigned role (e.g., provide a particular service(s) to users). During this time, if errors or problems occur, the administrator is responsible for figuring out the source of the error and determining the solution. Subsequently, the server may be brought online within the network so that the services offered by the new server may be used by customers, clients, etc. At this stage, the administrator may be required to bring down the network to allow the new server to be added to the network.

At each stage of the installation process for a new server, intervention by an administrator is necessary to complete the process. In some instances, the installation of servers may need to be completed over a network (e.g., a wide area network (WAN)), where the servers are connected via the network. In this case, the administrator needs to provide installation of a large number of similar systems. Typically, the network is a public area network, for which the administrator may need to consider security measures to ensure a secure installation across the network.

SUMMARY

In general, in one aspect, the invention relates to a method for installing an image on a client comprising obtaining a wanboot binary from the boot server, determining whether the wanboot binary is valid, obtaining a security payload from the boot server using the wanboot binary if the wanboot binary is valid, establishing a first secure connection between the client and boot server, obtaining a boot file system from the boot server using the first secure connection, installing the boot file system on the client to obtain a kernel, establishing a second secure connection between the client and an installation server using the security payload and the kernel, obtaining an installation image from the installation server using the kernel and the second secure connection, and installing the installation image on the client.

In general, in one aspect, the invention relates to a system, comprising a DHCP server configured to store client configuration information, a boot server configured to store a wanboot binary and a boot file system, an installation server configured to store an installation image, and a client configured to connect to the DHCP server to obtain the client configuration information, connect to boot server using the client configuration information to obtain the wanboot binary, connect to the boot server using the wanboot binary to obtain the boot file system, install the boot file system to obtain a kernel, connect to the installation server using the kernel to obtain the installation image, and install the installation image using the kernel.

In general, in one aspect, the invention relates to a plurality of nodes, comprising a DHCP server configured to store client configuration information, a boot server configured to store a wanboot binary and a boot file system, an installation server configured to store an installation image, and a client configured to connect to the DHCP server to obtain the client configuration information, connect to boot server using the client configuration information to obtain the wanboot binary, connect to the boot server using the wanboot binary to obtain the boot file system, install the boot file system to obtain a kernel, connect to the installation server using the kernel to obtain the installation image, and install the installation image using the kernel, wherein the DHCP server is located on any one of the plurality of nodes, wherein the boot server is located on any one of the plurality of nodes, wherein the installation server is located on any one of the plurality of nodes, and wherein the client server is located on any one of the plurality of nodes.

Other aspects of the invention will be apparent from the following description and the appended claims.

DETAILED DESCRIPTION

Figure 1:
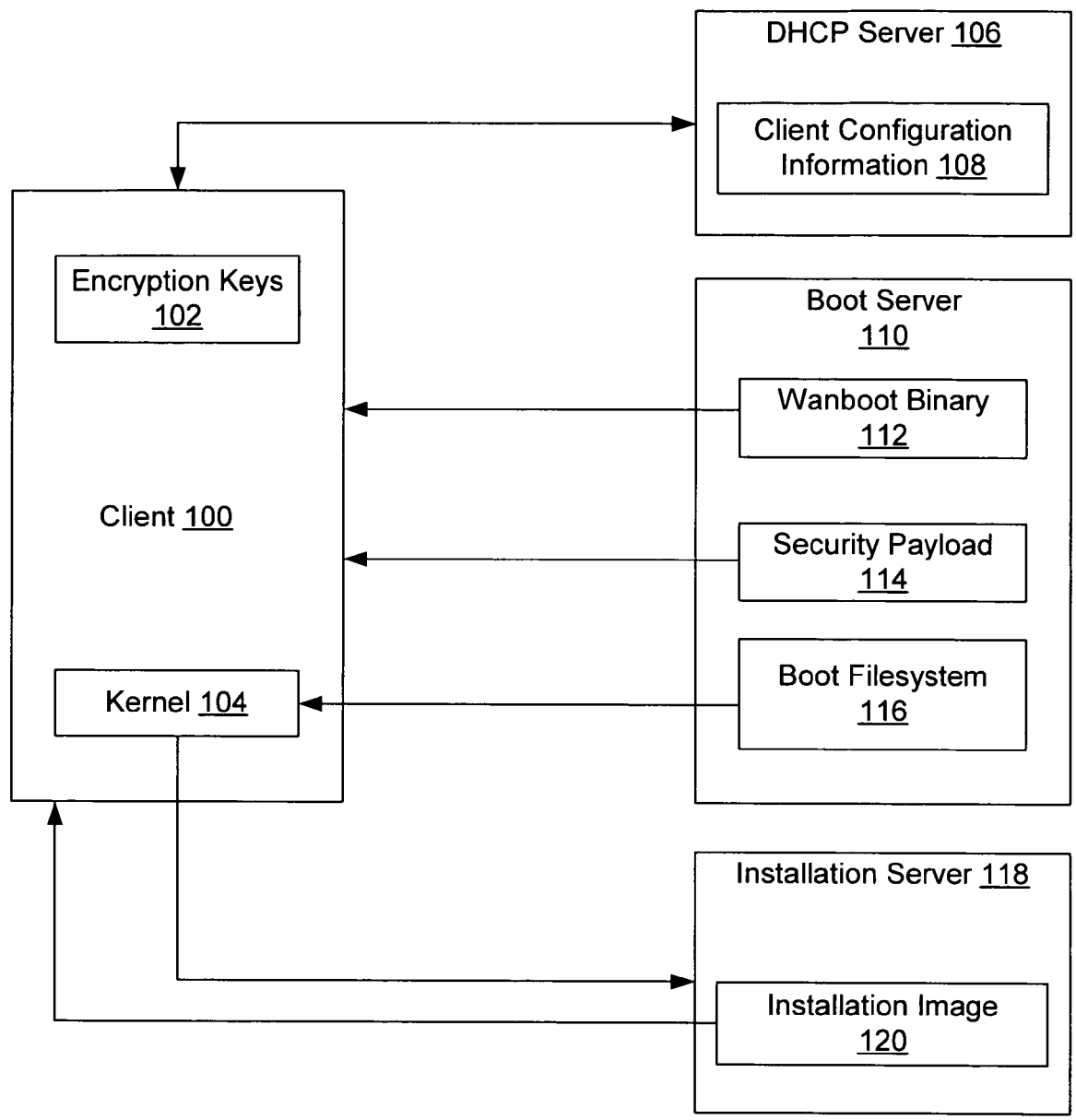
FIG. 1 shows a system in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, one or more embodiments of the invention relate to a method and system for installing an installation image on a client over a network. Further, one or more embodiments of the invention provide a method and system for installing the installation image on the client using a secure communications channel. Further, one or more embodiments of the invention include functionality to remotely install the installation image with minimal administrator interaction. Further, embodiments of the invention provide a method and system for installing installation images on a number of different platforms using the same installation infrastructure (i.e., the boot server, the DHCP server, the installation server, etc.).

FIG. 1 shows a system in accordance with one embodiment of the invention. In one embodiment of the invention, the system may include: a client (100), a Dynamic Host Configuration Protocol (DHCP) Server (106), a Boot Server (110), and an Installation server (118). In one embodiment of the invention, the DHCP server (106) includes client configuration information (108). In one embodiment of the invention, the client configuration information (108) corresponds to information that may be used to identify the client on the network and information that may be used by the client to locate other servers on the network, namely the boot server (110) and the installation server (118).

The client configuration information (108) may include the following information (not shown): a client internet protocol (IP) address, a client hostname, a boot server location, an installation server location, and an installation image location (or information indicating which installation image to install on the client (100)). The client IP address is assigned to the client (100) and uniquely identifies the client (100) on the network to which the client (100) is connected. Further, the client hostname provides an alphanumeric identifier for the client (100) on the network to which the client (100) is connected. The boot server location and the installation server location typically correspond to the IP address of the respective servers. The client (100) typically uses the boot server location and the installation server location to locate the boot server and the installation server, respectively, on the network. In one embodiment of the invention, the client configuration information (108) is configured on a per-client basis (i.e., one set of client configuration information (108) exists for each client (100)). In one embodiment of the invention, the client (100) obtains the client configuration information (108) from the DHCP server (106) using unicast DHCP.

Continuing with the discussion of FIG. 1, the boot server (110) typically includes a wanboot binary (112), a security payload (114), and a boot file system (116). In addition, the boot server (110) typically includes functionality to encrypt and decrypt data communicated to and received from the client (100). Further, the boot server (110) may include functionality to establish a secure connection between the boot server (110) and the client (100).

In one embodiment of the invention, the wanboot binary (112) corresponds to an executable file that includes the necessary functionality to establish connections (secure or insecure) between the client (100) and the boot server (110), and between the client (100) and the installation server (118). Further, the wanboot binary (112) includes the necessary functionality to install the boot file system (116) and extract the necessary information from the security payload (114). In one embodiment of the invention, the wanboot binary (112) is signed by the boot server (110) prior to sending the wanboot binary (112) to the client (100).

In one embodiment of the invention, the wanboot binary (112) is signed using a shared authentication key (described below). The client (100), upon receiving the signed wanboot binary (112), determines whether the signed wanboot binary (112) is valid. If the signed wanboot binary (112) is valid, then the wanboot binary (112) is installed on the client (100). Alternatively, if the signed wanboot binary (112) is not valid, then the signed wanboot binary (112) is not installed on the client (100). Those skilled in the art will appreciate, that the signed wanboot binary (112) corresponds to the wanboot binary accompanied by a digital signature signed using the shared authentication key.

Continuing with the discussion of FIG. 1, in one embodiment of the invention, the security payload (114) includes information that may be used to establish secure connections between the client (100) and the boot server (110), and between the client (100) and the installation server (118). In one embodiment of the invention, the secure connection corresponds to a connection using secure socket layer (SSL). In one embodiment of the invention, the security payload (114) may include a message digest algorithm type, a private key associated with the client (100) (i.e., the client's private key), and a client certificate (i.e., a digitally signed document that enables a communicating server to validate the client's authorization and name). In one embodiment of the invention, the security payload (114) is sent to the client in encrypted form. In particular, the security payload (114) may be encrypted using a shared encryption key.

Continuing with the discussion of FIG. 1, in one embodiment of the invention, the boot file system (116) includes a copy of a basic kernel (i.e., kernel (104) in FIG. 1) and the appropriate utilities, libraries, and files to allow the basic kernel to boot and run an installation image (120). In one embodiment of the invention, the wanboot binary (112) executing on the client (100) may initially determine whether the boot file system (116) is valid. Once the wanboot binary (112) has determined that the boot file system (116) is valid, then the wanboot binary (112) proceeds to extract the various components within the boot file system (116) and install them on to the client (100). In particular, the wanboot binary (112) loads and boots a kernel (104) on the client (100).

The kernel (104) (along with the aforementioned utilities and libraries) includes the necessary functionality to establish a secure connection between the client (100) and the installation server (118). Once a secure connection has been established, the installation image (120) is downloaded on the client (100) and subsequently booted and installed by the kernel (104) along with one or more of the aforementioned utilities and libraries.

In one embodiment of the invention, the installation server (118) includes one or more installation images (120). Further, the installation server (118) typically includes functionality to encrypt and decrypt data communicated to and received from the client (100). Further, the installation server (118) may include functionality to establish a secure connection between the installation server (118) and the client (100). In one embodiment of the invention, the installation image (120) corresponds to a set of files to be loaded onto the client (100) as well as information about specific configuration parameters for the client (100). These files may include all the files required to install a complete operating system as well as files associated with particular applications to load onto the client (100).

In one embodiment of the invention, the client (100) corresponds to a server that is the target of the installation image (i.e., the server that needs to be configured). Those skilled in the art will appreciate that a server may correspond to any system that includes a processor, a memory, and functionality to communicate with other computers via a network, serial cable, etc. Prior to the installation of wanboot binary (112), the client (100) typically includes encryption keys (102) and functionality to send and receive data for a remote source (i.e., the DHCP server (106)) as well as to encrypt and decrypt data from the remote source. In one embodiment of the invention, the encryption keys (102)

include the shared encryption key and the shared authentication key. The shared encryption key and the shared authentication key are typically symmetric keys.

In one embodiment of the invention, the shared encryption key is generated using a 3DES algorithm, and the shared authentication key is generated using the SHA-1 algorithm. Once the encryption keys (102) have been generated, they are typically stored in programmable read-only memory (PROM) on the client (100).

Further, the encryption keys are also stored on the boot server (110) to allow the boot server to encrypt and sign particular data (e.g., the wanboot binary, the security payload, etc.) prior to sending it to the client (100).

Those skilled in the art will appreciate that while the DHCP server (106), the boot server (110), and installation server (118) are all shown as individual servers, the functionality provided by each of the individual servers may be incorporated on a single server. Alternatively, the functionality of the servers may be grouped together in any combination.

Figure 2:
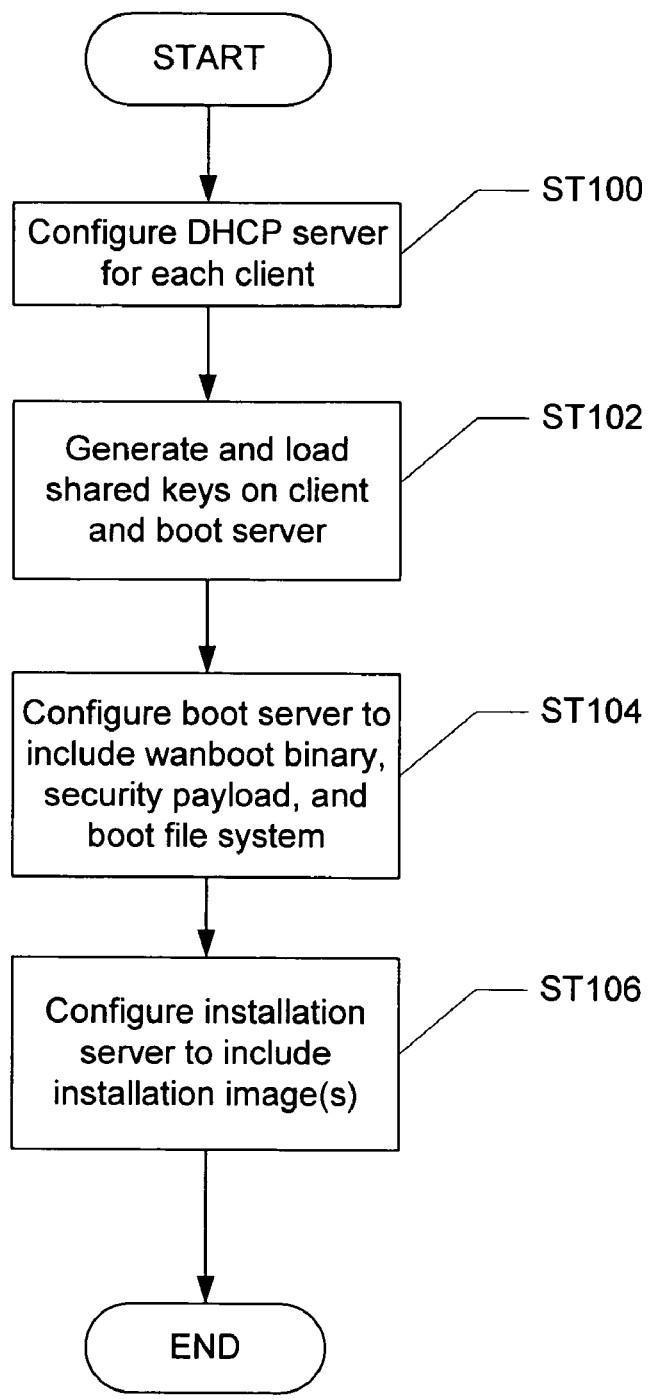
FIGS. 2-3 show flowcharts in accordance with an embodiment of the invention.

FIG. 2 shows a flowchart for setting up the DHCP server, the boot server, and the installation server, prior to installing an installation image on a client in accordance with one embodiment. Initially, the DHCP server is configured for each client (if more than one exists) or for the particular client on which the installation image is to be loaded (i.e., configured each time a client needs to be configured) (ST100). The configuration of the DHCP server may include obtaining the client configuration information for each client. The encryption keys (e.g., the shared encryption key and the shared authentication key) are subsequently generated and loaded onto the client and the boot server (ST102). In one embodiment of the invention, the boot server includes functionality to generate the encryption keys. Further, the encryption keys may be optionally loaded onto the DHCP server and the installation server depending on the security features available in the implementation of the invention.

The boot server is subsequently configured to include the wanboot binary, the security payload, and the boot file system (ST104). In one embodiment of the invention, there may be one wanboot binary for each hardware platform supported by the boot server. For example, there may be one wanboot binary for a RISC-based machine and another wanboot binary for a CISC-based machine. In addition, the boot server may also include one boot file system for each hardware platform supported by the boot server. In one embodiment of the invention, one security payload may be associated with each client. Alternatively, one security payload may be associated with all clients in the network. After the boot server has been configured, the installation server is configured by loading one or more installation images (ST106). In one embodiment of the invention, each installation image may correspond to a particular client configuration. For example, one installation image may exist for clients that are to be used as web servers, one installation image may exist for clients that are to be used as application servers, etc. At this stage the server(s) are now ready to perform a secure installation over a network.

Although not shown in FIG. 2, the encryption keys generated in ST102 above are typically loaded onto the client prior to performing the method described below in FIG. 3. Specifically, the encryption keys may be loaded on the PROM located on the client.

Figure 3:
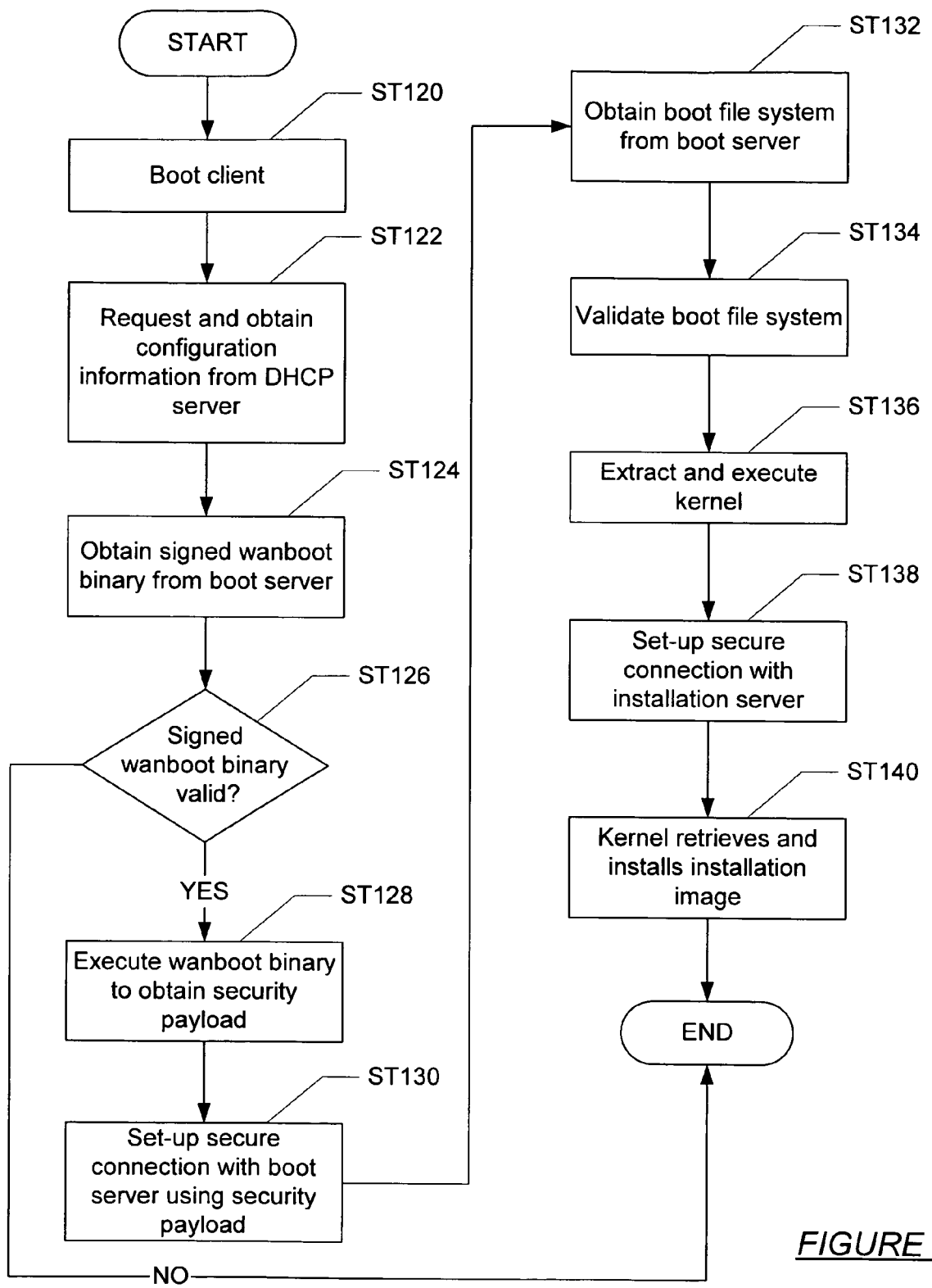

FIG. 3 shows a method for installing an installing image on a client in accordance with one embodiment of the invention. Initially, the client is booted up (i.e., powered on) (ST120). The boot up phase of the client typically results in a prompt being displayed to the user. Once the client is booted, the client sends a request and subsequently obtains client configuration information from the DHCP server (ST122). The client subsequently uses the client configuration to obtain the signed wanboot binary (i.e., the wanboot binary and an associated digital signature) from the boot server (ST124). In one embodiment of the invention, the signed wanboot binary is signed using the shared authentication key.

Upon receipt of the signed wanboot binary, the client determines whether the signed wanboot binary is valid (ST126). In one embodiment of the invention, the client uses the shared authentication key stored on the client to determine whether the signed wanboot binary is valid. If the signed wanboot binary is not valid, then the method terminates. Alternatively, if the signed wanboot boot binary is valid, then the wanboot binary is subsequently extracted and executed to obtain the security payload from the boot server (ST128). The security payload is subsequently used to set up a secure connection between the client and the boot server (ST130). More specifically, in one embodiment of the invention, the wanboot binary extracts the necessary components from the security payload required to set up an SSL connection between the client and the boot server. The components from the security payload are then used to establish the secure connection. Once the secure connection has been established between the client and the boot server, the client obtains the boot file system from the boot server (ST132).

The client, typically via the wanboot binary, validates the boot file system (i.e., determines whether to mount the particular file system on the client) (ST134). Though not shown in FIG. 3, if the boot file system is not valid, then the method may either terminate, or the client may attempt to obtain a valid boot file system from the boot server. Continuing with the discussion of FIG. 3, the kernel is subsequently extracted from the boot file system and executed on the client (ST136). As mentioned above, the kernel extracted from the boot file system corresponds to an operating system that includes functionality to boot and install the installation image. Once the kernel is executing on the client, the kernel proceeds to set up a secure connection between the client and the installation server (ST138). More specifically, in one embodiment of the invention, the kernel obtains the necessary information from the security payload to set up a secure connection with the installation server.

The kernel subsequently retrieves and installs the installation image from the installation server (ST140). More specifically, in one embodiment of the invention, the kernel obtains a particular installation image using the client configuration information obtained in ST122.

Those skilled in the art will appreciate that the invention may be implemented on a distributed system having a plurality of nodes, where each portion of the invention (e.g., the client, the DHCP server, the installation server, etc.) may be located on a different node within the distributed system. In one embodiment of the invention, the node corresponds to a computer system. Alternatively, the node may correspond to a processor with associated physical memory.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for installing an image on a client comprising:
   obtaining a wanboot binary from a boot server;
   verifying that the wanboot binary is valid;
   executing the wanboot binary to obtain a security payload from the boot server, wherein the security payload is used to create a first secure connection and a second secure connection;
   establishing the first secure connection between the client and boot server using the security payload;
   obtaining a boot file system from the boot server using the first secure connection, wherein the boot file system comprises a kernel;
   loading, by the wanboot binary, the kernel on the client, wherein the kernel is configured to install an installation image on the client;
   executing the kernel to establish the second secure connection between the client and an installation server using the security payload;
   obtaining the installation image from the installation server using the kernel and the second secure connection; and
   executing the kernel to install the installation image on the client.

2. The method of claim 1, further comprising:
   obtaining client configuration information from a DHCP server.

3. The method of claim 2, wherein the client configuration information comprises:
   a client internet protocol address;
   a client hostname;
   a boot server location;
   an installation server location; and
   an installation image location.

4. The method of claim 2, wherein the client establishes the first secure connection with the boot server using the client configuration information.

5. The method of claim 2, wherein the client establishes the second secure connection with the installation server using the client configuration information.

6. The method of claim 2, wherein the client configuration information is obtained using unicast DHCP.

7. The method of claim 2, wherein the client configuration information is configured on a per-client basis.

8. The method of claim 1, wherein the wanboot binary obtained from the boot server is signed using a shared authentication key.

9. The method of claim 8, wherein the shared authentication key is a symmetric key.

10. The method of claim 8, wherein the shared authentication key is generated using a SHA-1 algorithm.

11. The method 8, wherein the wanboot binary is valid if the wanboot binary is signed using the shared authentication key associated with the client.

12. The method of claim 1, wherein the security payload comprises:
    a message digest algorithm type;
    a client private key; and
    a client certificate.

13. The method of claim 1, wherein the security payload is obtained in encrypted form from the boot server.

14. The method of claim 13, wherein the security payload is encrypted using a shared encryption key.

15. The method of claim 14, wherein the shared encryption key is a symmetric key.

16. The method of claim 14, wherein the shared encryption key is generated using a 3DES algorithm.

17. The method of claim 1, wherein the first secure connection is a secure socket layer (SSL) connection.

18. The method of claim 17, wherein the SSL connection is established using the client certificate.

19. The method of claim 1, wherein the second secure connection is a secure socket layer (SSL) connection.

20. The method of claim 19, wherein the SSL connected is established using the client certificate.

21. The method of claim 20, wherein the client comprises a shared authentication key and a shared encryption key.

22. The method of claim 21, wherein the shared authentication key and the shared encryption key are stored in a programmable read only memory in the client.

23. The method of claim 1, wherein the wanboot binary includes functionality to establish the first secure connection between the client and the boot server.

24. The method of claim 1, wherein the boot file system comprises a utility and a library.

25. The method of claim 1, wherein an appropriate utility and an appropriate library are obtained from the boot server when boot file system is obtained.

26. The method of claim 25, wherein the appropriate utility and appropriate library provide the kernel the functionality to install the installation image.

27. A system, comprising:
    a DHCP server configured to store client configuration information;
    a boot server configured to store a wanboot binary and a boot file system;
    an installation server configured to store an installation image; and
    a client configured to:
       connect to the DHCP server to obtain the client configuration information,
       connect to boot server using the client configuration information to obtain the wanboot binary,
       execute the wanboot binary to connect to the boot server to obtain the boot file system, wherein the boot file system comprises a kernel,
       load, by the wanboot binary, the kernel on the client, wherein the kernel is configured to install an installation image on the client,
       execute the kernel to connect to the installation server to obtain the installation image, and
       execute the kernel to install the installation image on the client.

28. The system of claim 27, wherein the boot server is further configured to store a security payload.

29. The system of claim 28, wherein the client is further configured to obtain the security payload using the wanboot binary.

30. The system of claim 28, wherein the security payload comprises:
    a message digest algorithm type;
    a client private key; and
    a client certificate.

31. The system of claim 28, wherein the security payload is obtained in encrypted form from the boot server.

32. The system of claim 31, wherein the security payload is encrypted using a shared encryption key.

33. The system of claim 31, wherein the shared encryption key is generated using a 3DES algorithm.

34. The system of claim 32, wherein the shared encryption key is a symmetric key.

35. The system of claim 28, wherein the security payload is used to establish a secure connection between the client and the boot server.

36. The system of claim 35, where the secure connection is a secure socket layer connection.

37. The system of claim 28, wherein the security payload is used to establish a secure connection between the client and the installation server.

38. The system of claim 37, where the secure connection is a secure socket layer connection.

39. The system of claim 27, wherein the client connects to the DHCP server using DHCP unicast.

40. The system of claim 27, wherein the DHCP server is configured on a per-client basis.

41. The system of claim 27, wherein the wanboot binary obtained from the boot server is signed using a shared authentication key.

42. The system of claim 41, wherein the shared authentication key is a symmetric key.

43. The system of claim 42, wherein the shared authentication key is generated using a SHA-1 algorithm.

44. The system of claim 27, wherein the client configuration information comprises:
   a client internet protocol address;
   a client hostname;
   a boot server location;
   an installation server location; and
   an installation image location.

45. The system of claim 27, wherein the client establishes the connection with the boot server using the client configuration information.

46. The system of claim 27, wherein the client establishes the connection with the installation server using the client configuration information.

47. The system of claim 27, wherein the client configuration information is obtained using unicast DHCP.

48. The system of claim 27, wherein the client comprises a shared authentication key and a shared encryption key.

49. The system of claim 48, wherein the shared authentication key and the shared encryption key are stored in a programmable read only memory in the client.

50. The system of claim 27, wherein the boot file system comprises a utility and a library.

51. The system of claim 27, wherein an appropriate utility and an appropriate library are obtained from the boot server when boot file system is obtained.

52. The system of claim 51, wherein the appropriate utility and appropriate library provide the kernel the functionality to install the installation image.

53. A plurality of nodes, comprising:
   a DHCP server configured to store client configuration information;
   a boot server configured to store a wanboot binary and a boot file system;
   an installation server configured to store an installation image; and
   a client configured to:
      connect to the DHCP server to obtain the client configuration information,
      connect to boot server using the client configuration information to obtain the wanboot binary,
      execute the wanboot binary to connect to the boot server to obtain the boot file system, wherein the boot file system comprises a kernel,
      load, by the wanboot binary, the kernel on the client, wherein the kernel is configured to install an installation image on the client,
      execute the kernel to connect to the installation server to obtain the installation image, and
      execute the kernel to install the installation image on the client,
   wherein the DHCP server is located on any one of the plurality of nodes,
   wherein the boot server is located on any one of the plurality of nodes,
   wherein the installation server is located on any one of the plurality of nodes, and
   wherein the client server is located on any one of the plurality of nodes.

* * * * *